United States Patent
Laraqui et al.

(10) Patent No.: US 9,572,158 B2
(45) Date of Patent: Feb. 14, 2017

(54) RESIDENTIAL LOCAL BREAK OUT IN A COMMUNICATION SYSTEM

(71) Applicant: Telefonaktiebolaget L M Ericsson (publ), Stockholm (SE)

(72) Inventors: Kim Laraqui, Solna (SE); Karl Norrman, Stockholm (SE); Ioanna Pappa, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/416,726

(22) PCT Filed: Apr. 30, 2014

(86) PCT No.: PCT/SE2014/050540
§ 371 (c)(1),
(2) Date: Jan. 23, 2015

(87) PCT Pub. No.: WO2015/167381
PCT Pub. Date: Nov. 5, 2015

(65) Prior Publication Data
US 2015/0373710 A1 Dec. 24, 2015

(51) Int. Cl.
*H04W 72/04* (2009.01)
*H04W 12/02* (2009.01)
(Continued)

(52) U.S. Cl.
CPC ......... *H04W 72/0453* (2013.01); *H04W 12/02* (2013.01); *H04W 12/04* (2013.01); *H04W 88/08* (2013.01)

(58) Field of Classification Search
CPC .. H04W 12/02; H04W 12/04; H04W 72/0453; H04W 88/08; H04L 12/66; H04L 2012/46; H04L 2012/5618; H04L 12/46
(Continued)

(56) References Cited

U.S. PATENT DOCUMENTS 5,001,755 A * 3/1991 Skret ............... H04L 12/403
380/37
5,914,958 A * 6/1999 Chinitz ............... H04B 7/264
370/331
(Continued)

FOREIGN PATENT DOCUMENTS

NZ WO2005/057842 * 6/2005 ............... H04L 9/00
WO 2010039085 A1 4/2010

OTHER PUBLICATIONS

International Search Report, International application No. PCT/SE2014/050540. Date of mailing: Jan. 15, 2015. European Patent Office, Rijswijk, NL.

*Primary Examiner* — Warner Wong
(74) *Attorney, Agent, or Firm* — Coats & Bennett, P.L.L.C.

(57) ABSTRACT

Method and residential control node for enabling encrypted residential communication of user data between two wireless communication devices. The method comprises receiving a radio bearer mapping from a communication network node, establishing a connection with a first wireless communication device, in accordance with the radio bearer mapping, and establishing a connection with a second wireless communication device, in accordance with the radio bearer mapping. Furthermore, the method comprises obtaining a first key which is based on a key of the first wireless communication device, from the communication network node, and obtaining a second key which is based on a key of the second wireless communication device. Thereby, the residential control node is enabled to decrypt user data received from the first wireless communication device by the first key, and encrypting the user data by the second key, before sending the user data to the second wireless communication device.

28 Claims, 8 Drawing Sheets

(51) Int. Cl.
*H04W 12/04* (2009.01)
*H04W 88/08* (2009.01)

(58) Field of Classification Search
USPC .............................. 370/329, 341, 466–467
See application file for complete search history.

(56) References Cited

U.S. PATENT DOCUMENTS

| | | | | |
|---|---|---|---|---|
| 7,539,315 | B2* | 5/2009 | Watanabe | H04L 9/0822 380/279 |
| 8,607,068 | B2* | 12/2013 | Sibert | G06F 21/10 713/189 |
| 2002/0036985 | A1* | 3/2002 | Jonas | H04L 5/1438 370/235 |
| 2006/0234731 | A1* | 10/2006 | Taylor | H04L 63/0442 455/466 |
| 2009/0046621 | A1* | 2/2009 | Kimura | H04L 12/66 370/315 |
| 2010/0124228 | A1* | 5/2010 | Tinnakornsrisuphap | H04L 63/08 370/392 |
| 2011/0170556 | A1* | 7/2011 | Ozawa | H04N 7/17318 370/401 |
| 2012/0030466 | A1* | 2/2012 | Yamaguchi | H04L 9/0841 713/168 |
| 2012/0148050 | A1* | 6/2012 | Lewis | H04L 63/06 380/278 |
| 2013/0252585 | A1* | 9/2013 | Moshir | G06F 21/35 455/411 |
| 2013/0290701 | A1* | 10/2013 | Takenaka | H04L 9/0833 713/153 |
| 2016/0269353 | A1* | 9/2016 | Chan | H04L 61/1511 |

* cited by examiner

Fig. 1 (existing art)

RESIDENTIAL LOCAL BREAK OUT IN A COMMUNICATION SYSTEM

TECHNICAL FIELD

The present disclosure relates to management of wireless communication devices in residential environments, especially it relates to provisioning of secure residential communication between wireless communication devices.

BACKGROUND

With emergence of various communication services, new radio access technologies have been developed, which typically provide faster communication rates between wireless communication devices. In current communication networks, wireless communication devices connects to each other via RANs (Radio Access Networks) and core network nodes, as will be illustrated below in conjunction with the FIG. 1.

The term "wireless communication device" will be used throughout this description to denote any device which is capable of wireless communications. The term wireless communication device may thus include any device, which may be used by a user for wireless communications. Accordingly, the term wireless communication device may alternatively be referred to as a mobile terminal, a terminal, a user terminal (UT), a user equipment (UE), a wireless terminal, a wireless communication device, a wireless transmit/receive unit (WTRU), a mobile phone, a cell phone, a table computer, a smart phone, etc. Yet further, the term wireless communication device includes MTC (Machine Type Communication) devices, which do not necessarily involve human interaction. MTC devices are sometimes referred to as Machine-to-Machine (M2M) devices.

The term "USIM", standing for Universal Subscription Identity Module, is used throughout this document. It is understood by the man skilled in the art that this functionality can also be provided by a soft-SIM, an M2M SIM, eSIM, virtual SIM or any other contraption providing the same functionality.

Figure 1:
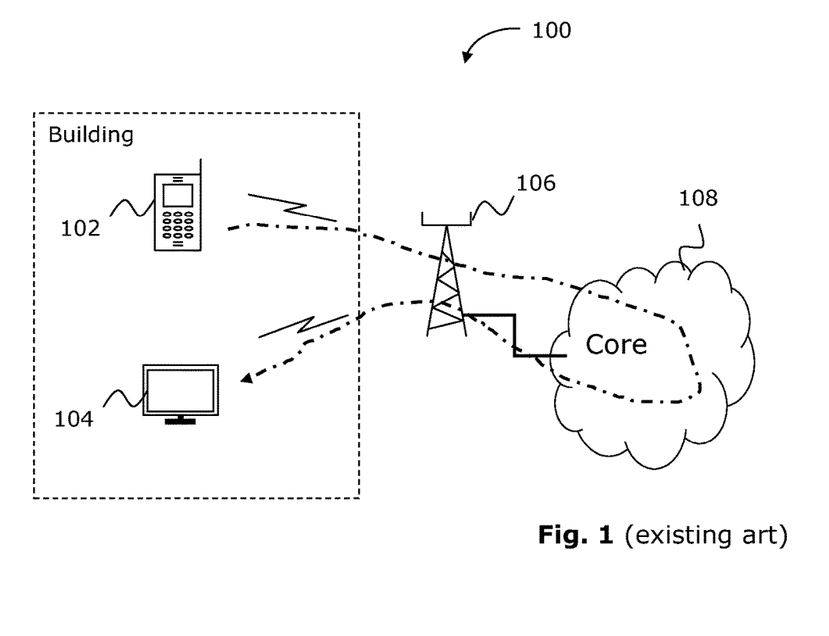
FIG. 1 is a schematic illustration of a scenario in accordance with existing art.

With reference to FIG. 1, which is a schematic overview of a communication network 100, a scenario where two wireless communication devices 102, 104 communicate with each other will now be described in accordance with existing art.

In this example, the first wireless communication device 102 is a UE and the second wireless communication device 104 is a HDTV (High Definition TeleVision) device. The UE 102 and the HDTV device 104 are located in a room of a building (dashed line). When user data will be transported from the UE 102 to the HDTV 104, the user data (dashed-dotted line) is transported on a first radio bearer via an eNodeB (Evolved NodeB) 106 to the core network, where a mapping is performed between the first radio bearer and a second radio bearer, and transported forward on the another radio bearer via the eNodeB 106 to the HDTV 104. The wireless communication devices are physically connected to the eNodeB by radio as seen in the figure, but to illustrate the principle solution, the transport of user data is illustrated by the dash-dotted line. The functionality of radio bearer mapping is arranged in a suitable core network node and is typically performed in accordance with the PDCP (Packet Data Convergence Protocol. For traditional radio access technologies the RANs have been bottlenecks for communication capacity. However, with emergence of modern and faster radio access technologies, limited communication capacity in backhaul networks which connect the RAN nodes, e.g. eNodeBs, have more and more been bottlenecks in the communication networks.

Thus, in order to increase end users experience, there is a need to make better and more effective use of installed communication resources.

SUMMARY

It would be desirable to obtain improved performance in residential areas when communicating user data. It is an object of this disclosure to address at least any of the issues outlined above.

Further, it is an object to increase end user experience when communicating user data between wireless communication devices. These objects may be met by a method and an arrangement according to the attached independent claims.

According to one aspect, a method performed by a residential control node of enabling encrypted residential communication of user data between a first wireless communication device and a second wireless communication device is provided. The method comprises receiving a radio bearer mapping from a communication network node, establishing a connection with the first wireless communication device, in accordance with the radio bearer mapping, and establishing a connection with the second wireless communication device, in accordance with the radio bearer mapping. Furthermore, the method comprises obtaining a first key which is based on a key of the first wireless communication device, from the communication network node, and obtaining a second key which is based on a key of the second wireless communication device. Thereby, the residential control node is enabled to decrypt user data received from the first wireless communication device by the first key, and encrypting the user data by the second key, before sending the user data to the second wireless communication device.

Furthermore, the method may comprise reception of a request from the first wireless communication device to communicate user data with the second wireless communication device and forwarding the request to the communication network node, wherein the radio bearer mapping is received in response to the forwarding of the request. The method may further comprise provisioning of an identity of the residential control node to the communication network node wherein the first key is further based on the identity of the residential control node, and the second key is further based on the identity of the residential control node.

According to a further aspect, a residential control node, which is adapted to perform the method steps of the above described aspect is also provided.

According to another aspect, a method performed in a communication network node, such as a RAN control node, of enabling encrypted residential communication of user data between a first wireless communication device and a second wireless communication device is provided. The method comprises initialising a connection between the first wireless communication device and the second wireless communication device via a residential control node, and deriving a first key and a second key and providing the first key and the second key to the residential control node, wherein the first key is related to a key of the first wireless communication device and the second key is related to a key of the second wireless communication device. Thereby the residential control node is enabled to decrypt user data received from the first wireless communication device by the first key, and encrypt the user data by the second key, before sending the user data to the second wireless communication device.

Furthermore, in the method initialising may comprise obtaining a radio bearer mapping and sending the radio bearer mapping to the residential control node.

According to a further aspect, a communication network node which is adapted to perform the method steps of the above described aspect is also provided.

According to further aspects, as well the residential control node and the communication network node may be implemented as suitable respective functions, or virtual nodes.

By arranging residential control nodes locally, wireless communication devices may be enabled to communicate securely with each other without passing the user data via the core network, which may reduce load on communication links of transport networks. Furthermore, end users of the wireless communication devices may perceive increased communication rates and less delay when communicating user data.

BRIEF DESCRIPTION OF DRAWINGS

The solution will now be described in more detail by means of exemplary embodiments and with reference to the accompanying drawings, in which.

DETAILED DESCRIPTION

By splitting up functionality of RAN nodes, such as eNodeBs in residential control nodes which are adapted to handle lower layers of communication protocol stacks, and flow control devices which are adapted to handle higher layers of communication protocol stacks, the residential control nodes will be enabled to forward user data from one wireless communication device directly to another wireless communication device without transporting the user data via the core network. When the wireless communication device requests a residential control node for a connection to the second wireless communication device, the residential control node requests the RAN control node to map the radio bearer of the second wireless communication device to a suitable radio bearer of the second wireless communication device, and requests also encryption keys derived from the pre-installed encryption keys of the wireless communication devices. The residential control device will then decrypt user data which is received from the first wireless communication device with one of the derived encryption keys, and encrypt the user data with the other of the derived encryption keys before sending the user data to the second wireless communication device.

Thus, with the present solution a network operator is enabled to offer end users in a residential environment to effectively make use of the installed RAN resources without increasing communication capacities of backhaul networks and core networks.

Figure 2:
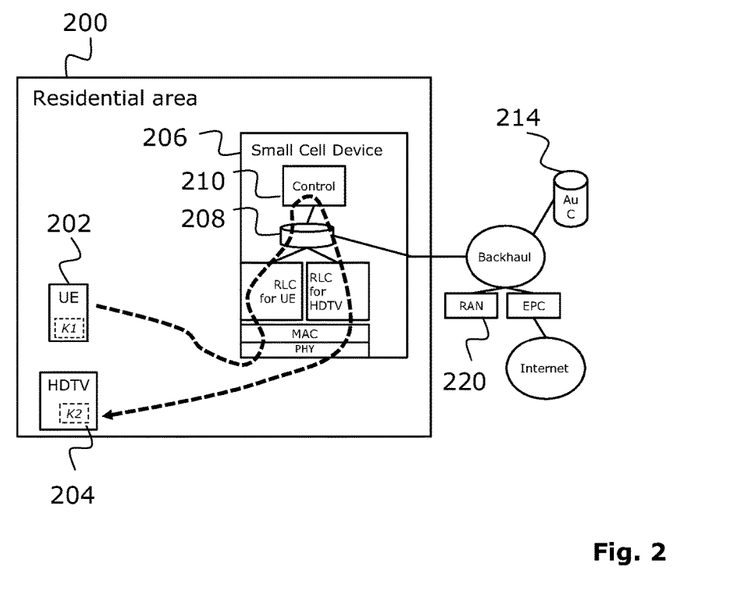
FIG. 2 is schematic block diagrams of an arrangement, according to a possible embodiment.

With reference to FIG. 2, which is a schematic block diagram, the principle of residential break out will now be described in accordance with two exemplifying embodiments.

In both the embodiments, two wireless communication devices 202, 204 are located in a residential area 200, e.g. a room of an office building. A first one of the wireless communication devices is implemented as a UE 202 and a second one is implemented as a HDTV (High Definition TeleVision) apparatus 204. As said, the HDTV is an example of a wireless communication device, and may comprise a UE adapted to communicate. However, in order to illustrate the principle solution, two different examples of wireless communication devices have been applied in the exemplifying embodiments. In the embodiment of FIG. 2 a residential small cell device 206 is arranged in the residential area 200, and the residential small cell device 206 is connected to a RAN (Radio Access Network) control node 220 via a backhaul network (not referred to). An AuC (Authentication centre) 214 of an operator is further arranged and the backhaul network is connected to the Internet via an EPC (Evolved Packet Core) interface.

FIG. 2 illustrates a situation where the UE 202 and the HDTV apparatus 204 are connected to each other in the residential area 200. The UE 202 and the HDTV apparatus 204 are connected and communicate user data on one radio bearer via a residential small cell device 206, which also will be referred to as residential control node. The residential small cell device 206 is a node which could be seen as a local break out of a radio access node, i.e. in an LTE environment, the small cell device 206 is a partial eNodeB. When transporting user data on one radio bearer, the UE 202 sends the user data encrypted with an encryption key UE-$K_{UPenc}$ which is derived in several steps from a key K1. The key K1 is installed in the USIM of a UE 202 and in the AuC (Authentication center) 214 of a core network. When the small cell device 206 receives user data from the UE 202, the user data is handled by various modules, such as a physical layer module (referred to as PHY), Medium Access Control module (referred to as MAC) and a Radio Link Control module (RLC), before arriving at a switch 208. Correspondingly, the user data is sent to the HDTV apparatus 204 via various modules referred to as RLC, MAC, and PHY. When put into practice, the user data of the UE 202 and the HDTV 204 are handled by respective instances of the RLC module, which is illustrated in the figure. When sent the user data is encrypted using a different encryption key HDTV-$K_{UPenc}$ compared to the one used by the UE 202. This different encryption key is of the same type, $K_{UPenc}$, but it is has been derived (in several steps) from a key K2 stored in the USIM of the HDTV apparatus 204. The key K2 is further stored at the AuC 214.

The two different keys, UE-$K_{UPenc}$ and HDTV-$K_{UPenc}$ are stored in a controller 210 which is arranged in the residential small cell device 206, e.g. to decrypt the user data with the key UE-$K_{UPenc}$ when received from the UE 202, and encrypt the user data with the key HDTV-$K_{UPenc}$ before being sent to the HDTV apparatus 204. The residential small cell device 206 needs access to the keys UE-$K_{UPenc}$ and HDTV- $K_{UPenc}$ and before starting to communicate the user data, the residential small cell device 206 will obtain these two keys UE-$K_{UPenc}$, HDTV-$K_{UPenc}$ from the RAN 220. In an alternative embodiment, the RAN provides keying material from which the residential small cell device can derive UE-$K_{UPenc}$ and HDTV-$K_{UPenc}$; example of the keying material being the respective $K_{eNB}$ shared between the RAN and the UE/HDTV respectively.

The residential small cell device 206 obtains the two keys UE-$K_{UPenc}$ and HDTV-$K_{UPenc}$ from the RAN 220. When the residential control node 206 receives a request from the UE 202 to connect to the HDTV apparatus 204, the residential control node 206 forwards the request to the core network and the RAN control module 220 establishes the connections between the HDTV apparatus 204 and the UE 202. The RAN control node 220 will then derive keying material for the UE and the HDTV (UE-$K_{UPenc}$ and HDTV-$K_{UPenc}$ respectively, or other keying material from which UE-$K_{UPenc}$ and HDTV-$K_{UPenc}$ respectively can be derived) The RAN control node 220 will forward these two keying materials to the residential control node 206, and will also map suitable radio bearers of the UE 202 and the HDTV apparatus 204. Further, the RAN control node 220 will request the residential control node 206 to connect to the UE 202 and the HDTV 204. As described above, the RAN control node 220 derives the keying materials or UE-$K_{UPenc}$ and HDTV-$K_{UPenc}$ from the respective $K_{eNB}$s it already shares with the UE 202 and the HDTV 204.

The RAN control node 220 share a key UE-$K_{eNB}$ with the UE 202 and a key HDTV-$K_{eNB}$ with the HDTV apparatus 204. These two $K_{eNB}$ keys are part of the LTE key hierarchy and are shared between the RAN control node 220 and the two wireless communication devices as long as they are transmitting user data over LTE spectrum. From the UE-$K_{eNB}$, the UE 202 and the RAN control node 220 can derive the encryption key UE-$K_{UPecn}$. This encryption key can be used when they communicate directly, as is the case in normal LTE. Likewise, the RAN control node 220 and the HDTV apparatus 204 can derive a shared encryption key HDTV-$K_{UPenc}$ from their shared HDTV-$K_{eNB}$.

When the residential control node 206 needs to relay data between the two wireless communication devices, it needs to decrypt the received uplink data and re-encrypt it when sending it to the other wireless communication device. In the current example with a UE 202 is transmitting data to a HDTV apparatus 204, so the residential control node 200 need to decrypt the data received from the UE 202. The RAN control node 220 therefore provides the residential control node 200 with keying material from which it can either derive the UE-$K_{UPenc}$ and HDTV-$K_{UPenc}$, or the actual UE-$K_{UPenc}$ and HDTV-$K_{UPenc}$ It should be noted that if the UE 202 and HDTV 204 are made aware of that they are using a local breakout function, the encryption keys can be made specific for the local breakout scenario by including a parameter known to both the UE 202 and the entity on the network side deriving the encryption key, analogously for the encryption key used by the HDTV apparatus 204. Thus, by breaking out communication functionality of eNodeBs and arranging residential small cell devices 206 at appropriate residential locations, a communication network operator will be enabled to provide wireless communication devices 202, 204 with the possibility to exchange user data with each other in a residential area, without installing full eNodeBs, such as so called femto base stations residentially. The RAN control functionality may instead be implemented in appropriate arranged RAN control nodes 220 which will serve a plurality of residential small cell devices 206. Thereby, an operator will be enabled to cost-effectively offer end users fast residential communications.

For instance, LTE (Long Term Evolution) local break out in existing solutions (e.g. SIPTO (Selected IP Traffic Offload) and LIPA (Local IP Access)) pre-supposes the existence of Packet Data Network Gateway (PGw) functionality at the point where traffic is broken out. This incurs complexity on those points, including IPSEC (IP Security), 3GPP (Third Generation Partnership Project) signalling etc. In femto based solutions this results in quite complex residential nodes, since these need to essentially include an entire, or parts of a, 3GPP core network.

The disclosed concept is not limited to provisioning of the derived keys UE-$K_{UPenc}$ and HDTV-$K_{UPenc}$ to the residential small cell device 206. Alternatively, which will be described below in conjunction with further exemplifying embodiments, the RAN control node 220 may derive suitable keys which are related to the UE-$K_{UPenc}$ and HDTV-$K_{UPenc}$, which will be applied when decrypting and encrypting at the residential control node 206.

Even if the above described embodiments relate to a UE 202 and a HDTV apparatus 204, the disclosed concept is not limited to these types of wireless communication devices. A skilled person understands how to implement the disclosed principles for any suitable types of wireless communication devices when appropriate.

It is also to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice.

It is also to be noted that the proposed solution is not limited to apply the specific keys types $K_{eNB}$ and $K_{UPenc}$ in an LTE environment. The disclosed concept will be applicable for any suitable access technology and any suitable pre-defined keys and keys derived from the pre-defined keys when put into practice.

Figure 3:
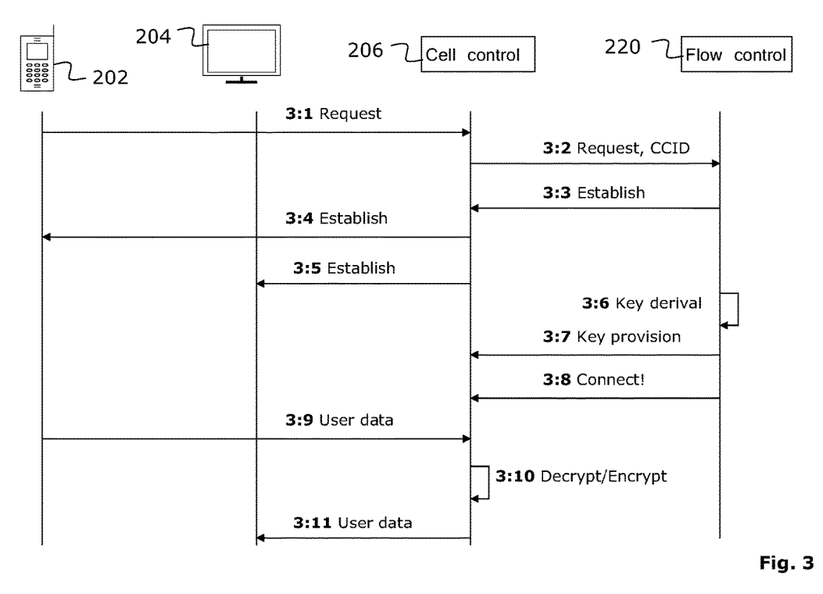
FIG. 3 is a schematic signalling diagram, according to possible embodiments.

With reference to FIG. 3, which is a schematic signalling diagram, a scenario where a UE 202 will send user data or content to a HDTV apparatus 204 will now be described in accordance with one exemplifying embodiment.

This exemplifying embodiment is related to some above described embodiments and the same reference numbers will therefore be used when appropriate, in order to simplify the understanding. In this scenario, an end user of the UE 202 will watch a TV-program on the HDTV apparatus 204.

In a first action 3:1, the UE 202 of the end user sends a request to establish a residential connection between the UE 202 and the HDTV 204 to the residential control node 206. In a following action 3:2, the residential control node 206 forwards the request to a RAN control node 220.

In response to the received request, in another action 3:3, the RAN control node 220 maps suitable radio bearers of the UE 202 and the HDTV 204 and instructs the residential control node 206 to establish connections to respective UE 202 and the HDTV apparatus 204 on the mapped radio bearers. When put into practice, the actual radio bearer mapping may be performed in a suitable core node, e.g. an MME (Mobility Management Entity), which the RAN control node 220 calls.

In following actions 3:4 and 3:5, the residential control node 206 then establishes these connections according to the received instruction.

The RAN control node derives keys which are related to pre-installed keys of the UE 202 and the HDTV apparatus 204, in a following action 3:6. In this exemplifying embodiment the RAN control node 220 derives the keys from the $K_{eNB}$ shared with each communication device respectively. The RAN control node 220 received the key from the core network, which derived it in several steps from the key shared between the AuC and the UE. In a subsequent action 3:7 the derived keys are provided to the residential control node 206. Then, in a following action 3:9, the residential control node 206 receives user data from the UE 202. In another following action 3:10, the residential control node decrypts the received user data by applying the derived key which is related to the UE 202 and encrypts the decrypted user data by applying the derived key which is related to the HDTV apparatus 204. In a final action 3:11, the residential control node 206 sends the re-encrypted user data, i.e. the user data which is encrypted by the derived key related to the HDTV apparatus 204, to the HDTV apparatus 204.

Thereby, the wireless communication devices, i.e. the UE 202 and the HDTV apparatus 204 are enabled to exchange user data in a residential environment, without causing additional traffic load on the backhaul network. In addition, due to the fact that the user data will not be affected by limitations in traffic capacity and various delays of the backhaul network, the end user experience may be further increased.

In another exemplifying embodiment which is related to the above described one, the residential control node 206 may provide the request of the action 3:2 with a CCID (Cell Control Identification) code or marking. This CCID code or marking may be applied when deriving the further keys in the action 3:6 in order to ensure that the related keys are provided to the correct residential control node.

It is to be noted that the above described exemplifying embodiments is described in a non-limiting manner and that some actions may be performed in an alternative order within the disclosed concept. For instance, the key deriving of action 3:6 and the key provisioning of action 3:7 may be performed simultaneously as the residential control node establishes the connections, i.e. the actions 3:4 and 3:5 respectively, or before these actions. Additionally, in an optional action 3:8, the RAN control node 220 may notice the residential control node 206, that the keys are delivered such that the residential control node 206 could start to receive user data. In an alternative exemplifying embodiment, which is related to the above described one, a core network node, such as an MME realises that the two wireless communication devices, i.e. the UE 202 and the HDTV 204 already communicates user data via the core network, but that they are located in a residential environment. In this alternative embodiment the MME may then provide an appropriate radio bearer mapping according to the action 3:3, without being preceded by any request 3:1, 3:2.

Figure 4:
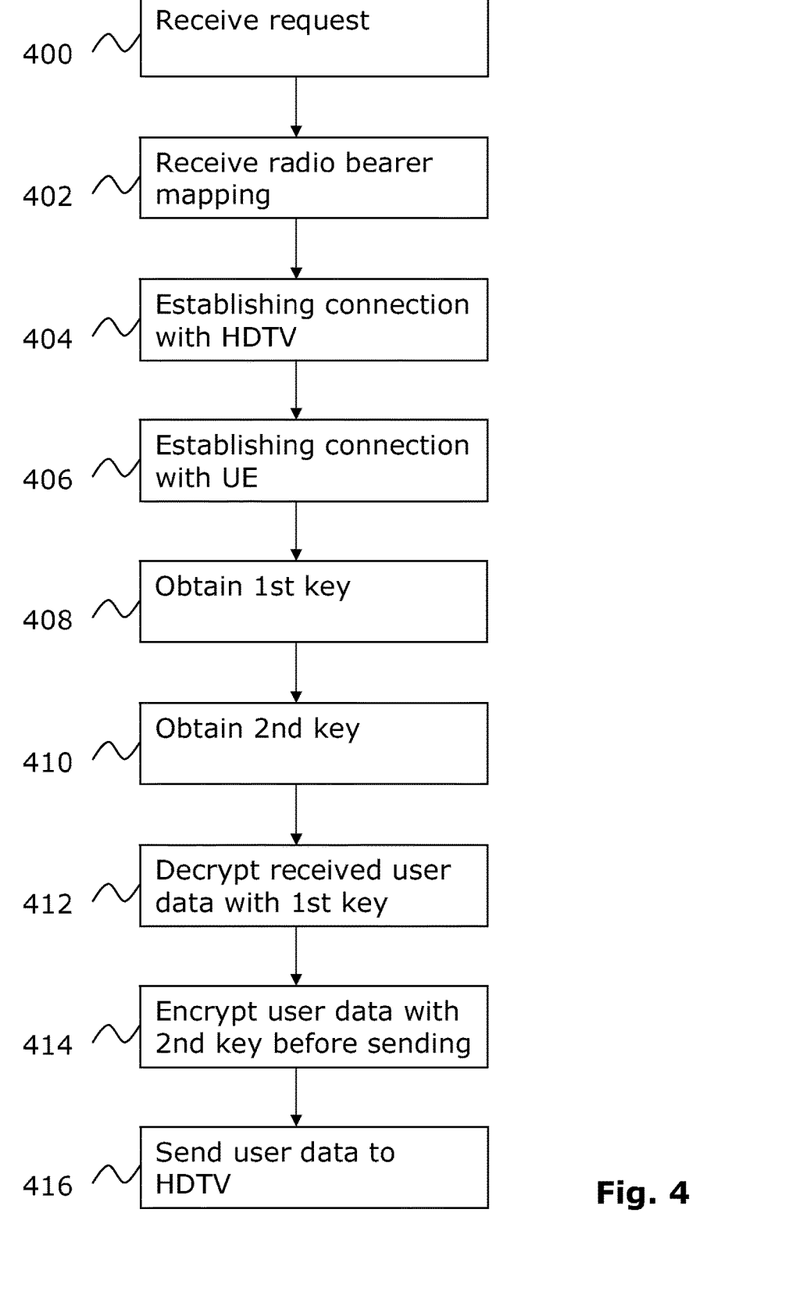
FIG. 4 is a schematic flow chart of a method, according to possible embodiments.

With reference to FIG. 4, which is a schematic flow chart, a method of a residential control node will now be described in accordance with one exemplifying embodiment.

The residential control node 206 and is arranged in a residential environment where two wireless communication devices 202, 204 are located. The first wireless communication device is a UE 202 and the second wireless communication device is a HDTV apparatus 204.

This embodiment relates to some embodiments described above and the corresponding reference numbers will be applied when appropriate.

In a first action 400, the residential control node 206 receives a request from the UE 202 to communicate user data or content with the HDTV 204. The request is directed to a core node, e.g. a MME (Mobility Management Entity), and the residential control node 206 forwards the request to a RAN control node 220. As said above, the residential control node 206 and the RAN control node 220 are to be seen as a split up of a suitable radio base station function, e.g. an eNodeB, where the residential control node 206 handles lower layers of a communication protocol stack and the RAN node 220 handles higher layers.

In a following action 402, the residential control node receives a radio bearer mapping from the RAN control node 220, where the radio bearer mapping defines an appropriate radio bearers for the UE 202 and the HDTV apparatus 204, such that they will be able to communicate user data with each other.

In another action 404, the residential control node 206, establishes a connection to the HDTV apparatus 204 in accordance with the radio bearer mapping, and in a yet another action 406, the residential control node establishes another connection to the UE 202 also in accordance with the radio bearer mapping of action 402.

However, to exchange user data between the UE 202 and the HDTV 204, the residential control node 206 needs encryption keys of the UE 202 and the HDTV 204, and in other actions 408 and 410, the residential control node 206 receives the respective encryption keys of the UE 202 and the HDTV 204 from the RAN control node 220.

In a following action 412, encrypted user data is received by the residential control node 206 and is decrypted with the first key, and in another action 414 the user data is encrypted with the second key. In a final action 416, the residential control node sends the encrypted user data to the HDTV apparatus 204. Thus, with the above described method, an end user of the HDTV is enabled to receive and make use of user data or content which is sent by the UE 202 via the residential control node, without being transported via the core network.

It is to be noted that the principle solution of the above described embodiment may be alternatively performed within the disclosed concept. For instance, in an alternative embodiment, which is related to the above described one, the request may be provided directly to the RAN control node 220. The action 400 is then omitted and the residential control node starts with receiving a radio bearer mapping from the RAN control node. It is also to be noted that some of the above described actions may be performed in an alternative order within the disclosed concept. For instance may the keys been obtained before or simultaneously as the radio bearer mapping is received or the connections are established, as stated above in another embodiment.

Figure 5:
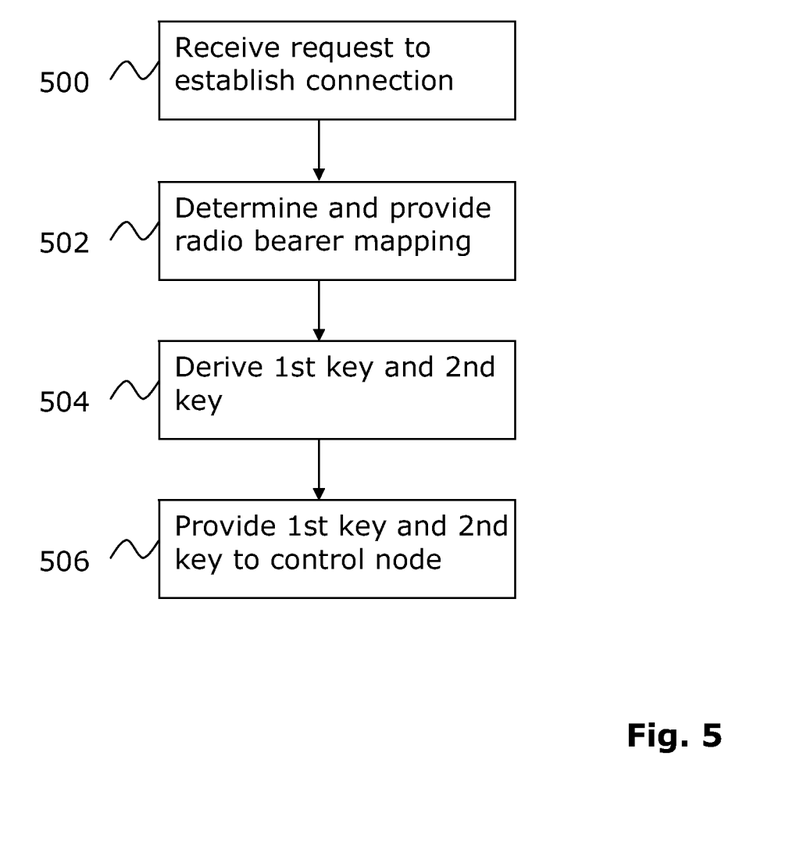
FIG. 5 is a schematic flow chart of a method, according to possible embodiments.

With reference to FIG. 5, which is a schematic flow chart, a method performed by a communication network node will now be described in accordance with one exemplifying embodiment. The communication network node is connected to a residential control node which has been disclosed in conjunction with some embodiments.

In this exemplifying embodiment the communication network node is implemented as a RAN control node.

In a first action 500, the RAN control node receives a request to establish a connection between a first wireless communication device and a second wireless communication device. The request is received from the first communication network node. In this embodiment is the request received via the residential control node.

However, the request may alternatively be received directly from the first wireless communication device, or via any other suitable communication network node.

In response to the reception, the RAN control node initialises the connection by obtains an appropriate radio bearing mapping for the wireless communication devices, in a following action 502. In this embodiment the radio bearer mapping is obtained from an MME (Mobility Management Entity). The radio bearer mapping is provided to the residential control node. However, the concept is not limited thereto, the RAN control node may obtain the radio bearer mapping from any suitable core network node which comprises functionality therefore.

In another action 504, respective encryption keys are derived for the first and second wireless communication devices, where the first encryption key is derived from a key of the first wireless communication device and the second encryption key is derived from a key of the second wireless communication device. In this embodiment, the first and second keys are calculated based on respective base keys which are individually shared between the wireless communication device and the RAN controller node respectively; that is, the first wireless communication device shares the first key with the RAN controller node, and the second wireless communication device shares the second key with the RAN controller node. The base keys may be the so called the $K_{eNB}$ keys in LTE. They could also be manually pre-provisioned keys (in the wireless communication devices and in the RAN controller, or in the wireless communication devices and the residential controller). The base keys may further have been established by running a specific key establishment protocol between the wireless communication devices and the RAN controller or between the wireless communication devices and the residential controller.

In a final action 506, the first and the second keys are provided to the residential control node. Thereby, the residential control node will be enabled to receive encrypted user data from the first wireless communication device according to the radio bearer mapping, decrypt the user data with the first key, encrypt the decrypted user data by applying the second key and send the encrypted user data to the second wireless communication device according to the radio bearer mapping.

As stated in another exemplifying embodiment, the radio bearer mapping and the key deriving are not limited to be performed in any specific order. A designer may select to perform the radio bearer mapping and the key deriving in any suitable order when appropriate, for instance the action 506 may be performed before the radio bearer mapping, i.e. the action 506 is then performed as a pre-provisioning of the first and the second keys in the residential control node. In the case when the keys are pre-provided the action 506 may further be omitted.

Figure 6:
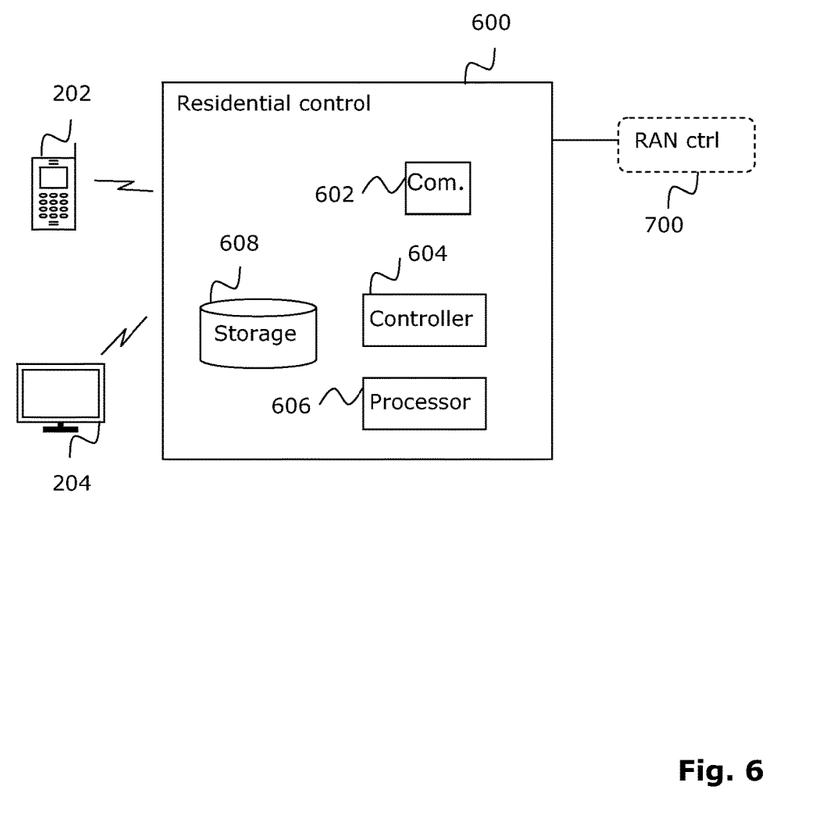
FIG. 6 is a schematic block diagram of a residential control node, according to possible embodiments.

With reference to FIG. 6, which is a schematic block diagram, a residential control node 600 will now be described in accordance with one exemplifying embodiment.

The residential control node 600 is adapted to be connected to a plurality of wireless communication devices. In this embodiment the wireless communication devices are implemented as a UE 202 and a HDTV apparatus 204. The residential control node 600 comprises a communication module 602 and a controller 604, and optionally a processor 606 and a storage means 608.

The communication module 602 is adapted to receive a request from the UE 202 to communicate user data or content with the HDTV apparatus 204 via the residential control node 600. The controller 604 is adapted to obtain a radio bearer mapping for communicating user data or content between the UE 202 and the HDTV apparatus 204. Obtaining may e.g. be performed by forwarding the received request to a RAN control node 700 and receiving the radio bearer mapping in response to the forwarded request, or by receiving the radio bearer mapping upon initiation from the RAN control node 700. The controller 604 is further adapted to establish respective connections with the UE 202 and the HDTV apparatus 204 according to the radio bearer mapping. The controller 604 is further adapted to receive a first key and a second key from the RAN control node 700, such that the residential control node 600 will receive encrypted user data from the UE 202, decrypt the user data with the first key, and encrypt the decrypted user data with the second key before sending the re-encrypted user data to the HDTV apparatus 204.

Thereby, the residential control node 600 is enabled to convey user data or content between the UE 202 and the HDTV apparatus 204 without passing the core network.

It is to be noted that the residential control node 600 is not limited to convey the data from the UE to the HDTV apparatus, it may instead convey user data from the HDTV apparatus to the UE, or convey user data between any suitable wireless communication devices in a residential environment when appropriate.

The optional processor 606 may be applied to provide further calculation capacity to the residential control node 600. The storage means 608 may store suitable pre-provided keys, e.g. keys for wireless communication devices which frequently apply the residential control node 600.

Figure 7:
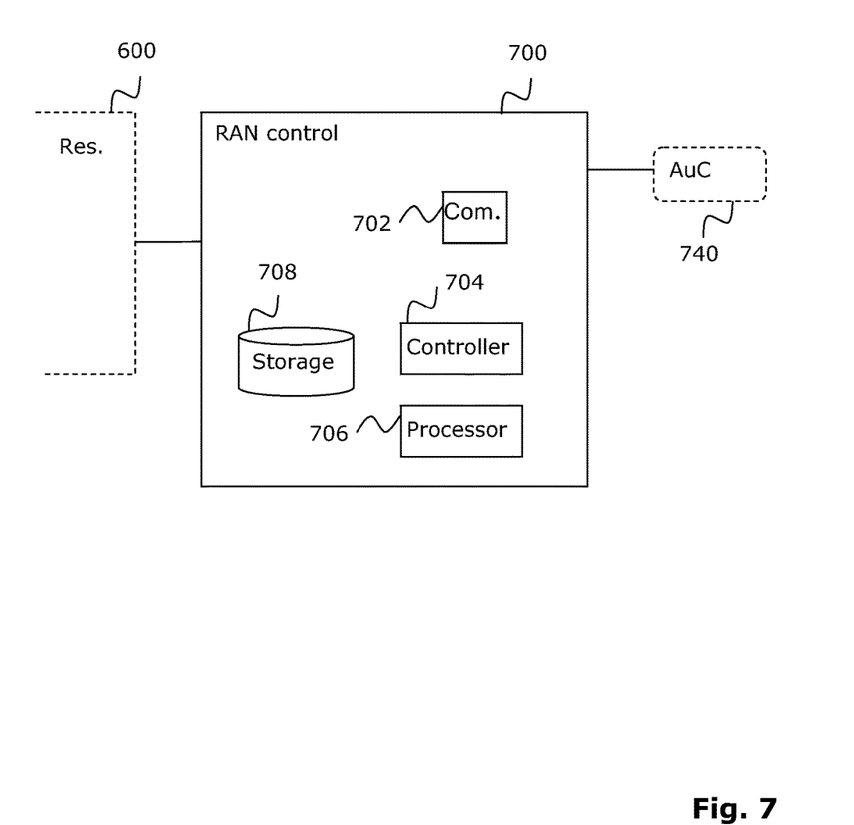
FIG. 7 is a schematic block diagram of a RAN control node, according to possible embodiments.

With reference to FIG. 7, which is a schematic block diagram, a RAN control node 700 will now be described in accordance with one exemplifying embodiment.

The RAN control node 700 is adapted to be connected to a residential control node 600. The RAN control node 700 comprises a communication module 702 and a controller 704, and optionally a processor 706 and a storage module 708.

The communication module 702 is adapted to receive a request for connections between two wireless communication devices (not shown) via the residential control node 600. The request may be received forwarded from one of the wireless communication devices or from a suitable core network node, e.g. an MME (Mobility Management Entity). The controller 704 is adapted to derive respective encryption keys which are related to the respective of the first wireless communication device and the second wireless communication device, and the communication module is further adapted to provide the first and second keys to the residential control node 600. The deriving of the encryption keys has been described in conjunction with other exemplifying embodiments and will therefore not be further discussed herein. Furthermore, the controller 704 is further adapted to initialise the connections, which also has been discussed above.

In an alternative embodiment, which is related to the embodiment described above, a core network node registers that two wireless communication devices are located in a residential environment and communicates user data or content with each other via the core network. The controller 704 of the RAN control node 700 is further adapted to receive a radio bearer mapping from the core network node and instruct the residential control node 600 to convey user data between the wireless communication devices via the residential control node 600, as disclosed in another embodiment.

The optional processor 706 may be applied to provide further calculation capacity to the RAN control node 700. The storage means 708 may store the first and the second keys and the radio bearer mapping.

Figure 8:
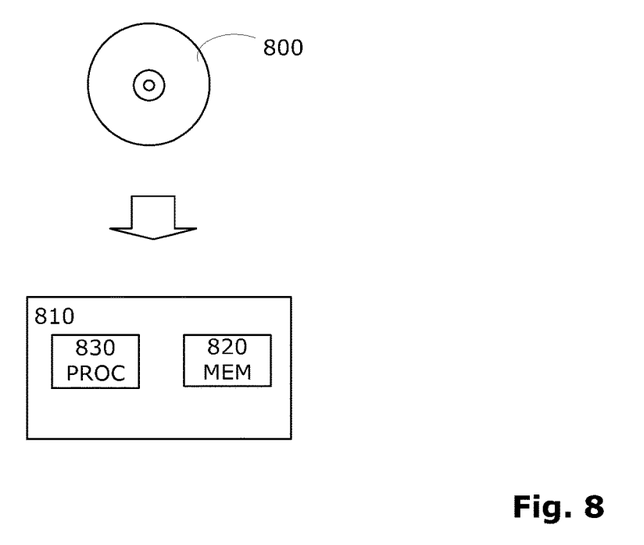
FIG. 8 is a schematic illustration of a computer program product, according to possible embodiments.

According to some exemplifying embodiments, a computer program product comprises a computer readable medium such as, for example, a diskette or a CD-ROM as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the methods shown in the FIG. 4 or 5.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. The disclosed residential control nodes and RAN control nodes are also not limited to be implemented as specific physical nodes. A designer may select to implement corresponding residential control functions and RAN control functions as virtual nodes in any suitable servers which are connected to the communication network, within the disclosed concept.

Moreover, the corresponding functionality of the residential control node may further be applied in alternative locally arranged control nodes. For instance, enterprise control devices may be arranged in local environments within the disclosed concept.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method, performed by a residential control node, of enabling encrypted residential communication of user data between a first wireless communication device and a second wireless communication device, the method comprising:
   receiving a radio bearer mapping from a communication network node;
   establishing a connection with the first wireless communication device, in accordance with the radio bearer mapping;
   establishing a connection with the second wireless communication device, in accordance with the radio bearer mapping;
   obtaining a first key which is based on a key of the first wireless communication device, from the communication network node; and
   obtaining a second key which is based on a key of the second wireless communication device,
   such that the residential control node is enabled to decrypt user data received from the first wireless communication device by the first key, and encrypt the user data by the second key, before sending the user data to the second wireless communication device.

2. The method according to claim 1, further comprising decrypting, with the first key, user data received from the first wireless communication device;
   encrypting, with the second key, the decrypted user data; and
   sending the encrypted user data to the second wireless communication device.

3. The method according to claim 1, further comprising receiving a request from the first wireless communication device to communicate user data with the second wireless communication device; and
   forwarding the request to the communication network node, wherein the radio bearer mapping is received in response to the forwarding of the request.

4. The method according to claim 1,
   wherein obtaining the first key comprises requesting the communication network node for the first key which has been derived from the key of the first wireless communication device and in response receiving the first key; and
   wherein obtaining the second key comprises requesting the communication network node for the second key which has been derived from the key of the second wireless communication device and in response receiving the second key.

5. The method according to claim 1, further comprising providing an identity of the residential control node to the communication network node, wherein the first key is further based on the identity of the residential control node, and the second key is further based on the identity of the residential control node.

6. The method according to claim 1, wherein the residential control node receives the user data and sends the user data according to at least one access technology of: Long Term Evolution, LTE, LTE Advanced, Wireless Fidelity, Wi-Fi, and WiMax.

7. A residential control node configured to enable encrypted residential communication of user data between a first wireless communication device and a second wireless communication device, the residential control node comprising:
a communication circuit configured to receive a radio bearer mapping from a communication network node; and
a controller circuit which is configured to
establish a connection with the first wireless communication device in accordance with the radio bearer mapping,
establish a connection with the second wireless communication device in accordance with the radio bearer mapping,
obtain a first key which is based on a key of the first wireless communication device, from the communication network node; and
obtain a second key which is based on a key of the second wireless communication device,
such that the residential control node is enabled to decrypt user data received from the first wireless communication device by the first key, and encrypt the user data by the second key, before sending the user data to the second wireless communication device.

8. The residential control node according to claim 7, wherein the communication circuit is further configured to receive a request from the first wireless communication device and forward the request to communicate user data with the second wireless communication device.

9. The residential control node according to claim 7, wherein the controller circuit is configured to
obtain the first key by requesting the communication network node for the first key which has been derived from the key of the first wireless communication device and in response, receiving the first key; and
obtain the second key by requesting the communication network node for the second key which has been derived from the key of the second wireless communication device and in response, receiving the second key.

10. The residential control node according to claim 7, wherein the controller circuit is further configured to
provide an identity of the residential control node to the communication network node; and
wherein the first key is further based on the identity of the residential control node, and the second key is further based on the identity of the residential control node.

11. The residential control node according to claim 7, wherein the residential control node is configured to receive the user data and send the user data according to at least one access technology of: Long Term Evolution, LTE, LTE Advanced, Wireless Fidelity, Wi-Fi, and WiMax.

12. A method, performed by a communication network node, of enabling encrypted residential communication of user data between a first wireless communication device and a second wireless communication device, the method comprising:
initializing a connection between the first wireless communication device and the second wireless communication device via a residential control node;
deriving a first key and a second key; and
providing the first key and the second key to the residential control node, wherein the first key is related to a key of the first wireless communication device and the second key is related to a key of the second wireless communication device, such that the residential control node is enabled to decrypt user data received from the first wireless communication device by the first key, and encrypt the user data by the second key, before sending the user data to the second wireless communication device.

13. The method according to claim 12, wherein
the first key is a decryption key for decrypting user data received from the first wireless communication device; and
the second key is an encryption key for encrypting user data decrypted by the first key before sending the encrypted user data to the second wireless communication device.

14. The method according to claim 12, wherein initializing comprises obtaining a radio bearer mapping and sending the radio bearer mapping to the residential control node.

15. The method according to claim 12, wherein deriving the first key and the second key comprises:
requesting and receiving a first base key and a second base key from an authentication center (AuC) wherein the first base key is being individually shared between the first wireless communication device and the communication network node, and the second base key is being individually shared between the second wireless communication device and the communication network node; and
calculating the first key based on the first base key and calculating the second key based on the second base key.

16. The method according to claim 12, wherein the request further comprises an identity of the residential control node, and wherein the deriving of the first key and the second key is further based on the identity of the residential control node.

17. The method according to claim 12, wherein the communication network node calculates the first key and the second key to enable the communication of user data in accordance with at least one access technology of: Long Term Evolution, LTE, LTE Advanced, Wireless Fidelity, Wi-Fi, and WiMax.

18. A communication network node configured to be connected to a residential control node and enable encrypted residential communication of user data between a first wireless communication device and a second wireless communication device, the communication network node comprising:
a controller circuit configured to initialize the connection, and derive a first key and a second key, wherein the first key is related to a key of the first wireless communication device and the second key is related to a key of the second wireless communication device; and
a communication circuit configured to and providing the first key and the second key to the residential control node,
such that the residential control node is enabled to decrypt user data received from the first wireless communication device by the first key, and encrypt the user data by the second key, before sending the user data to the second wireless communication device.

19. The communication network node according to claim 18, wherein the controller circuit is configured to obtain a radio bearer mapping and send the radio bearer mapping to the residential control node, wherein the radio bearer mapping is received via the residential control node.

20. The communication network node according to claim 18, wherein the controller circuit is configured to:
request and receive a first base key and a second base key from an authentication center (AuC) wherein the first base key is being individually shared between the first wireless communication device and the communication network node, and the second base key is being individually shared between the second wireless communication device and the communication network node; and calculate the first key based on the first base key and calculate the second key based on the second base key.

21. The communication network node according to claim 18, wherein the communication circuit is configured to receive an identity of the residential control node; and wherein the controller circuit is configured to derive the first key and the second key further based on the identity of the residential control node.

22. The communication network node according to claim 18, wherein the communication network node is configured to calculate the first key and the second key to enable the communication of user data in accordance with at least one access technology of: Long Term Evolution, LTE, LTE Advanced, Wireless Fidelity, Wi-Fi, and WiMax.

23. A computer program product stored on a non-transitory, computer readable medium and comprising program instructions, wherein the program instructions, when executed by a processor of a node, causes the node to:

receive a radio bearer mapping from a communication network node;

establish a connection with a first wireless communication device, in accordance with the radio bearer mapping;

establish a connection with a second wireless communication device, in accordance with the radio bearer mapping;

obtain a first key which is based on a key of the first wireless communication device, from the communication network node; and obtain a second key which is based on a key of the second wireless communication device, such that the residential control node is enabled to decrypt user data received from the first wireless communication device by the first key; and encrypt the user data by the second key, before sending the user data to the second wireless communication device.

24. A computer program product stored on a non-transitory, computer readable medium and comprising program instructions, wherein the program instructions, when executed by a processor of a node, causes the node to:

initialize a connection between a first wireless communication device and a second wireless communication device via a residential control node;

derive a first key and a second key; and provide the first key and the second key to the residential control node, wherein the first key is related to a key of the first wireless communication device and the second key is related to a key of the second wireless communication device, such that the residential control node is enabled to decrypt user data received from the first wireless communication device by the first key, and encrypt the user data by the second key, before sending the user data to the second wireless communication device.

25. The method according to claim 1, wherein the first key is derived from a first base key from a core network and the second key is derived from a second base key from the core network.

26. The method according to claim 1, wherein the first key is derived from a first base key being individually shared between the first wireless communication device and the communication network node, and the second key is derived from a second base key being individually shared between the second wireless communication device and the communication network node.

27. The method according to claim 12, wherein deriving the first key and the second key comprises calculating the first key from a first base key from a core network and calculating the second key from a second base key from the core network.

28. The method according to claim 12, wherein deriving the first key comprises deriving the first key from a first base key being individually shared between the first wireless communication device and the communication network node, and wherein deriving the second key comprises deriving the second key from a second base key being individually shared between the second wireless communication device and the communication network node.

* * * * *

UNITED STATES PATENT AND TRADEMARK OFFICE
CERTIFICATE OF CORRECTION

PATENT NO.        : 9,572,158 B2
APPLICATION NO.   : 14/416726
DATED             : February 14, 2017
INVENTOR(S)       : Laraqui et al.

It is certified that error appears in the above-identified patent and that said Letters Patent is hereby corrected as shown below:

On the Title Page

The title page showing the illustrative figure should be deleted and replaced with the attached title page.

In item (56), under "FOREIGN PATENT DOCUMENTS", in Column 2, Line 1, delete "NZ WO2005/057842" and insert -- WO 2005/057842 --, therefor.

In the Drawings

In Fig. 2, Sheet 2 of 8, for Tag "220", in Line 1, delete "RAN" and insert -- RAN control node --, therefor. (As shown on the attached sheet)

In the Specification

In Column 1, Line 64, delete "Protocol." and insert -- Protocol). --, therefor.

In Column 3, Line 31, delete "is schematic block diagrams" and insert -- is a schematic block diagram --, therefor.

In Column 4, Line 23, delete "FIG. 2" and insert -- FIG. 2, --, therefor.

In Column 5, Line 3, delete "RAN 220." and insert -- RAN control node 220. --, therefor.

In Column 5, Line 10, delete "RAN 220." and insert -- RAN control node 220. --, therefor.

In Column 5, Line 14, delete "RAN control module 220" and insert -- RAN control node 220 --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*

In Column 5, Line 19, delete "derived) The" and insert -- derived). The --, therefor.

In Column 5, Line 36, delete "UE-$K_{UPecn}$." and insert -- UE-$K_{UPenc}$. --, therefor.

In Column 5, Line 46, delete "residential control node 200" and insert -- residential control node 206 --, therefor.

In Column 5, Lines 48-49, delete "residential control node 200" and insert -- residential control node 206 --, therefor.

In Column 5, Line 51, delete "HDTV-$K_{UPenc}$ It" and insert -- HDTV-$K_{UPenc}$. It --, therefor.

In Column 7, Lines 6-7, delete "embodiment" and insert -- embodiment, --, therefor.

In Column 7, Line 57, delete "embodiment" and insert -- embodiment, --, therefor.

In Column 8, Line 62, delete "embodiment" and insert -- embodiment, --, therefor.

In Column 9, Line 9, delete "embodiment" and insert -- embodiment, --, therefor.

In Column 9, Line 63, delete "embodiment" and insert -- embodiment, --, therefor.

In the Claims

In Column 12, Line 30, in Claim 2, delete "comprising" and insert -- comprising: --, therefor.

In Column 12, Line 37, in Claim 3, delete "comprising" and insert -- comprising: --, therefor.

In Column 13, Line 7, in Claim 7, delete "configured to" and insert -- configured to: --, therefor.

In Column 13, Line 16, in Claim 7, delete "node; and" and insert -- node, and --, therefor.

In Column 13, Line 31, in Claim 9, delete "configured to" and insert -- configured to: --, therefor.

(12) United States Patent
Laraqui et al.

(10) Patent No.: US 9,572,158 B2
(45) Date of Patent: Feb. 14, 2017

(54) RESIDENTIAL LOCAL BREAK OUT IN A COMMUNICATION SYSTEM

(71) Applicant: Telefonaktiebolaget L M Ericsson (publ), Stockholm (SE)

(72) Inventors: Kim Laraqui, Solna (SE); Karl Norrman, Stockholm (SE); Ioanna Pappa, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/416,726

(22) PCT Filed: Apr. 30, 2014

(86) PCT No.: PCT/SE2014/050540
§ 371 (c)(1),
(2) Date: Jan. 23, 2015

(87) PCT Pub. No.: WO2015/167381
PCT Pub. Date: Nov. 5, 2015

(65) Prior Publication Data
US 2015/0373710 A1 Dec. 24, 2015

(51) Int. Cl.
*H04W 72/04* (2009.01)
*H04W 12/02* (2009.01)
(Continued)

(52) U.S. Cl.
CPC ......... *H04W 72/0453* (2013.01); *H04W 12/02* (2013.01); *H04W 12/04* (2013.01); *H04W 88/08* (2013.01)

(58) Field of Classification Search
CPC .. H04W 12/02; H04W 12/04; H04W 72/0453; H04W 88/08; H04L 12/66; H04L 2012/46; H04L 2012/5618; H04L 12/46
(Continued)

(56) References Cited

U.S. PATENT DOCUMENTS

| 5,001,755 A | * | 3/1991 | Skret | H04L 12/403 380/37 |
| 5,914,958 A | * | 6/1999 | Chinitz | H04B 7/264 370/331 |

(Continued)

FOREIGN PATENT DOCUMENTS

| NZ | WO2005/057842 | * | 6/2005 | H04L 9/00 |
| WO | 2010039085 A1 | | 4/2010 | |

OTHER PUBLICATIONS

International Search Report, International application No. PCT/SE2014/050540. Date of mailing: Jan. 15, 2015. European Patent Office, Rijswijk, NL.

*Primary Examiner* — Warner Wong
(74) *Attorney, Agent, or Firm* — Coats & Bennett, P.L.L.C.

(57) ABSTRACT

Method and residential control node for enabling encrypted residential communication of user data between two wireless communication devices. The method comprises receiving a radio bearer mapping from a communication network node, establishing a connection with a first wireless communication device, in accordance with the radio bearer mapping, and establishing a connection with a second wireless communication device, in accordance with the radio bearer mapping. Furthermore, the method comprises obtaining a first key which is based on a key of the first wireless communication device, from the communication network node, and obtaining a second key which is based on a key of the second wireless communication device. Thereby, the residential control node is enabled to decrypt user data received from the first wireless communication device by the first key, and encrypting the user data by the second key, before sending the user data to the second wireless communication device.

28 Claims, 8 Drawing Sheets

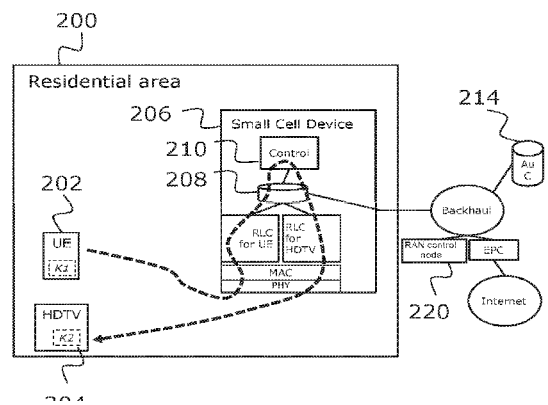

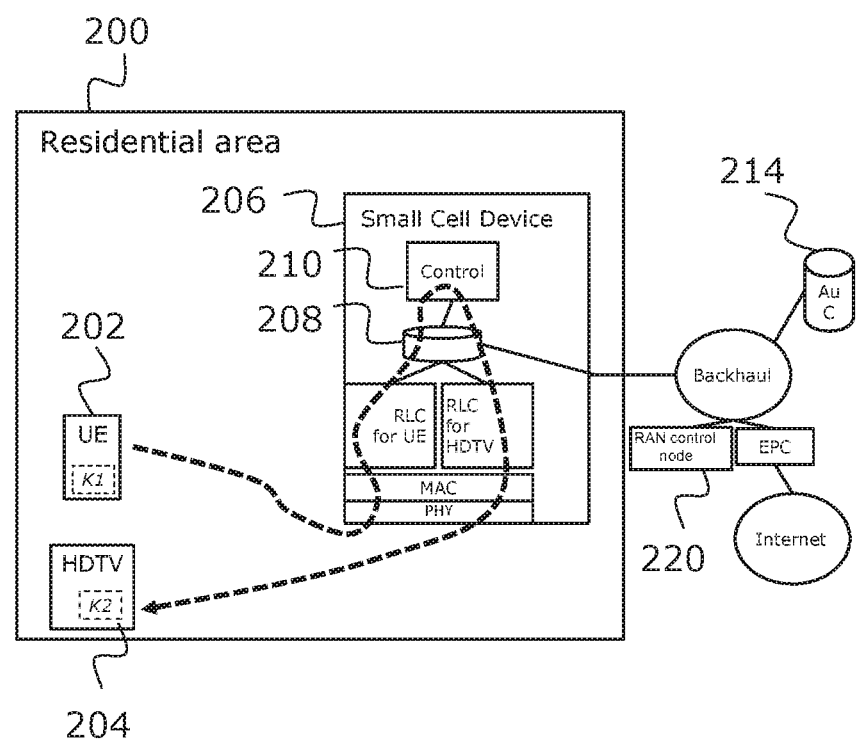
Fig. 2